US012752314B2

(12) United States Patent
Watanabe et al.

(10) Patent No.: US 12,752,314 B2
(45) Date of Patent: Oct. 6, 2026

(54) METHOD AND APPARATUS FOR CLEANING CARRIER FILM

(71) Applicants: Neturen Takuto Co., Ltd., Shizuoka (JP); Neturen Co., Ltd., Tokyo (JP)

(72) Inventors: Hisaaki Watanabe, Shizuoka (JP); Kazutoshi Asai, Shizuoka (JP); Kousuke Watanabe, Shizuoka (JP)

(73) Assignees: Neturen Takuto Co., Ltd., Shizuoka (JP); Neturen Co., Ltd., Tokyo (JP)

( * ) Notice: Subject to any disclaimer, the term of this patent is extended or adjusted under 35 U.S.C. 154(b) by 6 days.

(21) Appl. No.: 18/609,479

(22) Filed: Mar. 19, 2024

(65) Prior Publication Data

US 2024/0326101 A1 Oct. 3, 2024

(30) Foreign Application Priority Data

Mar. 30, 2023 (JP) ................................ 2023-056489

(51) Int. Cl.
*B08B 3/04* (2006.01)
*B08B 3/02* (2006.01)
*B08B 1/16* (2024.01)

(52) U.S. Cl.
CPC .............. *B08B 3/041* (2013.01); *B08B 3/024* (2013.01); *B08B 1/165* (2024.01); *B08B 3/022* (2013.01)

(58) Field of Classification Search
CPC ......... B08B 1/165; B08B 3/024; B08B 3/022; B08B 3/041
See application file for complete search history.

(56) References Cited

U.S. PATENT DOCUMENTS

2003/0068953 A1* 4/2003 Yamashita .......... B29C 63/0013 445/24
2007/0256711 A1* 11/2007 Hayashi .................... B08B 1/20 134/94.1
2021/0101185 A1* 4/2021 Nakagawa .......... B01F 25/4323
(Continued)

FOREIGN PATENT DOCUMENTS

CN 102651327 A * 8/2012 ....... H01L 21/67051
CN 113020079 A * 6/2021 ............. B08B 3/024
(Continued)

OTHER PUBLICATIONS

Korean Office Action (KROA) dated May 21, 2026 and issued for Korean patent application No. 10-2024-0039331.
(Continued)

*Primary Examiner* — Benjamin L Osterhout
(74) *Attorney, Agent, or Firm* — RANKIN, HILL & CLARK LLP

(57) ABSTRACT

Provided are method and apparatus for cleaning a carrier film such as a PET film, which are low in cost and environmental load, in cleaning of the carrier film for recycle. The method for cleaning the carrier film includes spraying water containing microbubbles onto a surface of the carrier film having a remaining dielectric ceramic layer, thereby peeling the remaining dielectric ceramic layer from the surface. The apparatus for cleaning the carrier film includes a holder that holds the carrier film having a remaining dielectric ceramic layer, and a nozzle that sprays water containing microbubbles onto a surface of the held carrier film to peel the remaining dielectric ceramic layer from the surface.

5 Claims, 6 Drawing Sheets

(56) References Cited

U.S. PATENT DOCUMENTS

| | | | |
|---|---|---|---|
| 2024/0149581 | A1 | 5/2024 | Tanino et al. |
| 2024/0254304 | A1 | 8/2024 | Nishio |

FOREIGN PATENT DOCUMENTS

| | | | | | |
|---|---|---|---|---|---|
| JP | 2001-179741 | A | | 7/2001 | |
| JP | 2003133159 | A | * | 5/2003 | |
| JP | 2008-098430 | A | | 4/2008 | |
| JP | 2022-148064 | A | | 10/2022 | |
| KR | 20080101961 | A | * | 11/2008 | ....... H01L 21/67739 |
| KR | 20140006699 | A | * | 1/2014 | ............... B08B 3/02 |
| TW | 201023254 | A | * | 6/2010 | ............. B08B 3/003 |
| WO | WO-2022190713 | A1 | * | 9/2022 | ......... B29C 63/0013 |
| WO | 2022/249956 | A1 | | 12/2022 | |

OTHER PUBLICATIONS

Japanese Office Action (JPOA) mailed Jun. 19, 2026 and issued for Japanese patent application No. 2023-056489.

* cited by examiner

METHOD AND APPARATUS FOR CLEANING CARRIER FILM

BACKGROUND

Technical Field

An embodiment relates to method and apparatus for cleaning a carrier film.

Related Art

A recycle system for re-using a PET film used in a multilayer ceramic capacitor manufacturing step has been proposed (Press Information TDK, Multilayer Ceramic Capacitor: Achievement of Recycle of PET Film (Jan. 14, 2022)). In the recycle system, a surface of a used PET film to be discarded is cleaned, and thereafter, the PET film turns back to PET resin (in a pellet form). Then, a film is formed from the resultant, and is subjected to special treatment. In this manner, the PET film is re-used in the manufacturing step.

SUMMARY

An object of the embodiment of the present invention is to provide method and apparatus for cleaning a carrier film such as a PET film, which are low in cost and environmental load, in cleaning of the carrier film for recycle.

The method for cleaning the carrier film according to the embodiment includes spraying water containing microbubbles onto a surface of the carrier film having a remaining dielectric ceramic layer, thereby peeling the remaining dielectric ceramic layer from the surface.

The apparatus for cleaning the carrier film according to the embodiment includes a holder that holds the carrier film having a remaining dielectric ceramic layer, and a nozzle that sprays water containing microbubbles onto a surface of the held carrier film to peel the remaining dielectric ceramic layer from the surface.

According to the embodiment, the method and apparatus for cleaning the carrier film, which are low in the cost and the environmental load, in cleaning of the carrier film for recycle are provided.

DETAILED DESCRIPTION

<Carrier Film>

First, a carrier film targeted for cleaning treatment performed for recycle in the present embodiment will be described.

Figure 1A:
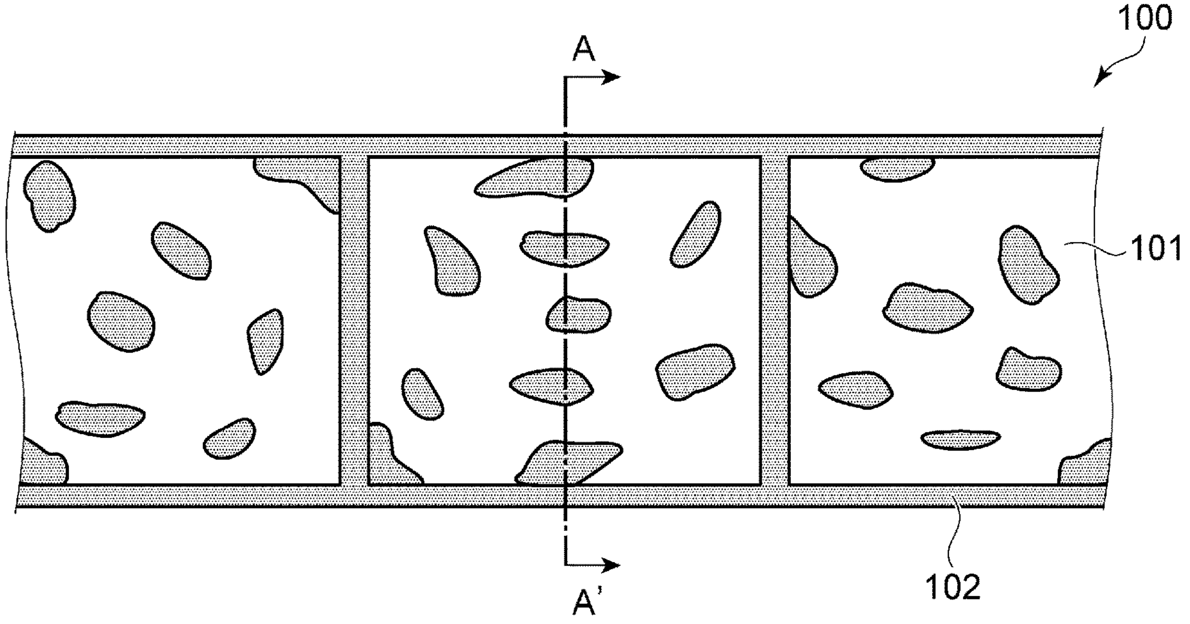
FIG. 1A is a conceptual plan view showing a carrier film targeted for cleaning treatment in an embodiment.
Figure 1B:
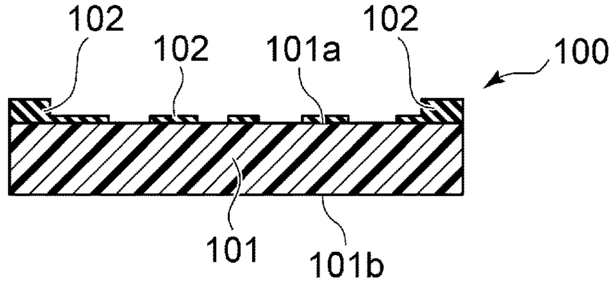
FIG. 1B is a conceptual sectional view taken along an A-A' line in FIG. 1A.

FIG. 1A is a conceptual plan view showing the carrier film targeted for the cleaning treatment in the present embodiment, and FIG. 1B is a conceptual sectional view taken along an A-A' line in FIG. 1A.

As shown in FIGS. 1A and 1, a dielectric ceramic layer 102 formed in a multilayer ceramic capacitor manufacturing step remains on a surface 101*a* of the carrier film 101 targeted for the cleaning treatment performed for recycle in the present embodiment.

The carrier film 101 having the remaining dielectric ceramic layer 102 on the surface 101*a* is, for example, a band-shaped film, and is wound in a coil shape upon storage and delivery.

Note that in FIG. 1A, the remaining dielectric ceramic layer 102 is shown with dots.

The carrier film 101 having the remaining dielectric ceramic layer 102 on the surface 101*a* is formed in the multilayer ceramic capacitor manufacturing step (well-known method).

That is, in the multilayer ceramic capacitor manufacturing step, a dielectric ceramic material is applied onto the surface 101*a* of the carrier film 101, and by drying, a ceramic sheet (also called a green sheet) is formed on the surface 101*a* of the carrier film 101. Next, for example, an internal electrode is printed onto a surface of the ceramic sheet by screen printing, and the resultant is dried in, e.g., a drying furnace. Thereafter, the ceramic sheet including the internal electrode is peeled from the carrier film 101 by, e.g., a peeling apparatus. As a result, part of the peeled ceramic sheet as shown in FIGS. 1A and 1B remains as the dielectric ceramic layer 102 on the surface 101*a* of the carrier film 101.

The carrier film 101 is made, for example, of polyethylene terephthalate (PET). The width and thickness of the carrier film 101 are set as necessary in the multilayer ceramic capacitor manufacturing step. The width (length of the short side in a case where the carrier film 101 is in a band shape) of the carrier film 101 is, for example, 20 cm or more and 100 cm or less, and the thickness is 15 μm or more and 250 μm or less.

In the present embodiment, one surface of the carrier film 101 will be referred to as a "first surface 101*a*," and the other surface will be referred to as a "second surface 101*b*." Moreover, the first surface 101*a* having the remaining dielectric ceramic layer 102 will be referred to as a "front surface," and the first surface 101*a* and the second surface 101*b* will also be collectively referred to as "both surfaces."

The dielectric ceramic layer 102 remains on the first surface 101*a* (front surface) of the carrier film 101, and is fixed to the carrier film 101. As described above, the remaining dielectric ceramic layer 102 is a residue on the front surface 101*a* of the carrier film 101 after the ceramic sheet including the internal electrode has been peeled from the carrier film in the multilayer ceramic capacitor manufacturing step.

For example, before the ceramic sheet including the internal electrode is peeled from the front surface 101*a* of the carrier film 101, for example, the ceramic sheet is uniformly formed across the entire region of the front surface 101*a* of the carrier film 101. When the ceramic sheet including the internal electrode is peeled from the carrier film 101, for example, by a peeling apparatus as described in JP-A-2003-133159, a portion, which corresponds to the peeled ceramic sheet including the internal electrode, of the remaining dielectric ceramic layer 102 is recessed, and the remaining dielectric ceramic layer 102 has a ladder shape (FIGS. 1A and 1B) on the front surface 101*a* of the carrier film 101 as part of the ceramic sheet.

The material of the remaining dielectric ceramic layer 102 is set as necessary based on the material of the dielectric ceramic applied onto the front surface 101*a* of the carrier film 101 in the multilayer ceramic capacitor manufacturing step. The remaining dielectric ceramic layer 102 is made, for example, of a material containing barium titanate as a main component and additionally containing a bismuth compound and a vitrified anti-reduction agent as accessory components. The thickness of the remaining dielectric ceramic layer 102 is, for example, 1 μm or more and 30 μm or less.

Note that in the multilayer ceramic capacitor manufacturing step, the ceramic sheet is formed on the first surface 101*a* (front surface) of the carrier film 101. However, in the multilayer ceramic capacitor manufacturing step, the carrier film 101 from which the ceramic sheet has been peeled is often continuously wound in the coil shape for recovery. For this reason, the remaining dielectric ceramic layer 102 may adhere to the second surface 101*b* (back surface) of an adjacent turn of the wound carrier film 101.

Next, method and apparatus for cleaning the carrier film according to the present embodiment will be described.

Figure 2A:
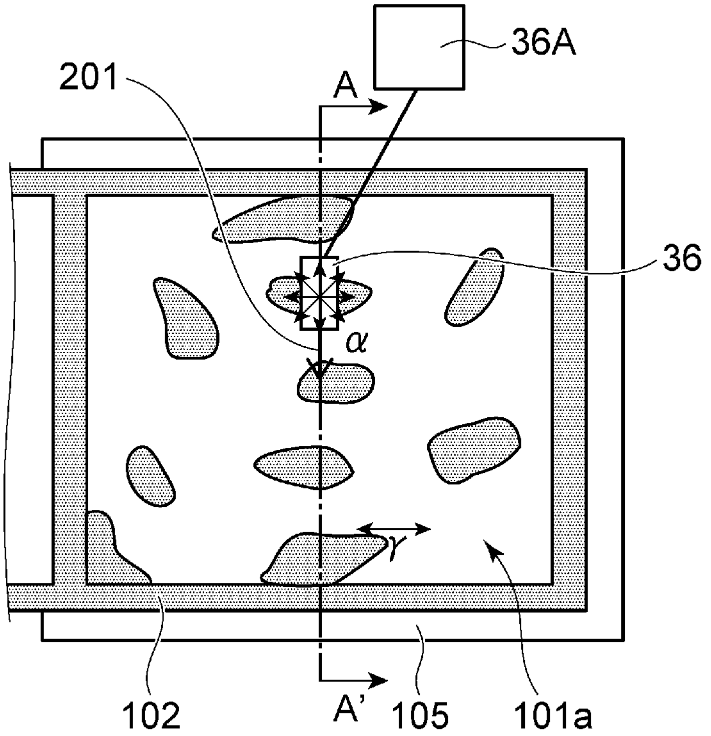
FIG. 2A is a conceptual plan view for describing method and apparatus for cleaning the carrier film in the embodiment.
Figure 2B:
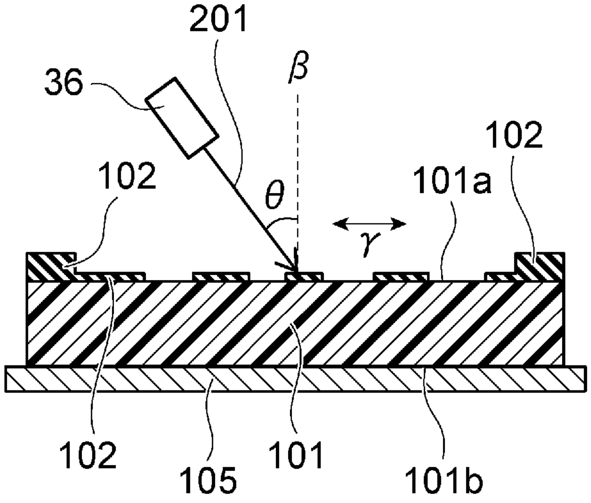
FIG. 2B is a conceptual sectional view taken along an A-A' line in FIG. 2A.

FIG. 2A is a conceptual plan view for describing the method and apparatus for cleaning the carrier film according to the embodiment, and FIG. 2B is a conceptual sectional view taken along an A-A' line in FIG. 2A.

As shown in FIGS. 2A and 2B, in the method for cleaning the carrier film according to the present embodiment, for example, the carrier film 101 used in the multilayer ceramic capacitor manufacturing step and having the remaining dielectric ceramic layer 102 on the front surface 101*a* is held on a stage 105 with the front surface 101*a* on the upper side, and the front surface 101*a* is sprayed with water 201 containing microbubbles. In this manner, the remaining dielectric ceramic layer 102 is peeled from the front surface 101*a*.

Figure 3:
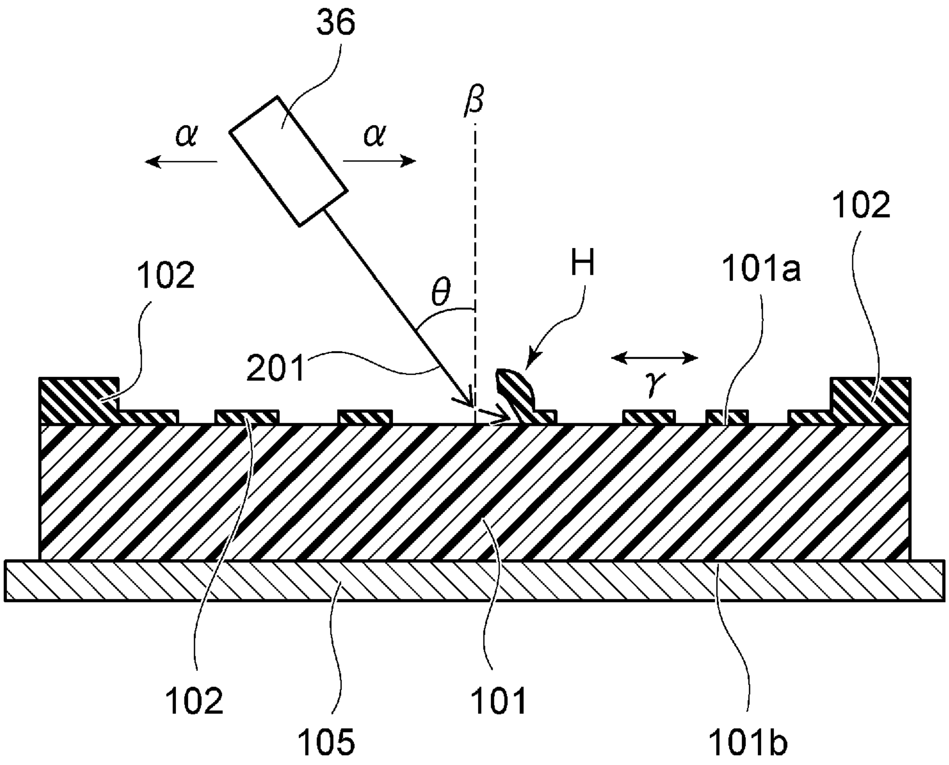
FIG. 3 is a conceptual sectional view showing a state when a remaining dielectric ceramic layer is peeled from a front surface by spraying of water containing microbubbles.

FIG. 3 is a conceptual sectional view showing a state when the remaining dielectric ceramic layer 102 is peeled from the front surface 101*a* by spraying of the water 201 containing the microbubbles in FIG. 2B.

As shown in FIGS. 2A, 2B, and 3, the front surface 101*a* of the carrier film 101 having the remaining dielectric ceramic layer 102 is sprayed with the water 201 containing the microbubbles, and in this manner, the remaining dielectric ceramic layer 102 is peeled H from the front surface 101*a*.

The mechanism of the peeling H is assumed to be as follows.

When the remaining dielectric ceramic layer 102 is sprayed with the water 201 containing the microbubbles, the microbubbles contained in the water burst due to sprayed water pressure when contacting the remaining dielectric ceramic layer 102, and by combination of bursting stress and spraying stress, the remaining dielectric ceramic layer 102 is peeled H from the front surface 101*a*.

In the method for cleaning the carrier film according to the present embodiment, the remaining dielectric ceramic layer 102 can be peeled by spraying of the water 201 containing the microbubbles as described above, and therefore, the method is low in cost and environmental load.

Note that in a case where the entirety of the remaining dielectric ceramic layer 102 is peeled from the front surface 101*a* of the carrier film 101, such peeling can be performed in such a manner that a nozzle 36 (described later) that sprays the water 201 containing the microbubbles is moved, for example, in a planar direction (direction y parallel with the front surface 101*a*, the same also applies hereinafter) a by a worker or a not-shown movement unit.

Note that the spraying indicates that the water containing the microbubbles is sprayed out in a certain direction.

The above-described spraying may be oscillation spraying. The oscillation spraying described here indicates such spraying that a jet (water containing the microbubbles) spraying direction temporally changes while oscillating in a plane. By such oscillation spraying, a wave-like jet (water containing the microbubbles) is emitted from the nozzle 36 so as to expand radially.

The oscillation spraying is employed as the spraying from the nozzle 36 as described above so that the remaining dielectric ceramic layer 102 can be more easily peeled.

Preferably, the water 201 containing the microbubbles is sprayed onto the front surface 101*a* at an angle θ in the planar direction y from a direction p perpendicular to the front surface 101*a*.

The above-described stresses act diagonally on the remaining dielectric ceramic layer 102 at the angle θ, and therefore, the remaining dielectric ceramic layer 102 can be more easily peeled from the front surface 101*a*.

The angle θ is, for example, 300 or more and 60° or less.

The nozzle 36 sprays (more preferably the oscillation spraying, the same also applies hereinafter) the water 201 containing the microbubbles onto the first surface (front surface) 101*a* of the carrier film 101 having the remaining dielectric ceramic layer 102. The nozzle 36 may be an ejector nozzle, a cavitation nozzle, or a swirling flow nozzle.

The nozzle 36 is coupled, for example, to a water supply apparatus 36A. Water supplied from the water supply apparatus 36A turns into the water containing the microbubbles by passing through the nozzle 36, and from the nozzle 36, is sprayed onto the front surface 101*a* of the carrier film 101 having the remaining dielectric ceramic layer 102.

Industrial water is suitably used as the "water" described here. Here, the industrial water is surface stream water to be raw water targeted for clarification such as flocculation and filtration for industrial and drinking purposes, such as river water, lake water, dam lake water, and pond water, and also includes water supplied to a business operator after simple flocculation and filtration at a water purification plant. However, the industrial water does not include well water and spring water.

Note that, e.g., well water, spring water, or pure water may be used as the "water" described here.

The "well water" indicates water from a well, and includes water emerging from the underground and accumulated in a well, water injected into and accumulated in a well, and water pumped up from a well into a deaerator pipe by operation of a vacuum pump.

The "spring water" indicates water flowing out from the underground to the ground surface in a natural state or water flowing into the ground surface.

The "pure water" indicates water having an electric resistivity of 0.1 Mω-cm or more.

The "microbubble" described here indicates an air bubble having a diameter of 1 μmm or less.

The microbubbles are generated in the water, and are supplied with dispersed in the water. The nozzle 36 is used for generating the microbubbles in the water, and gas forming the microbubbles is not particularly limited. The gas to be used for forming the microbubbles may include, for example, inert gas such as air, nitrogen, carbon dioxide, and rare gas and oxidized gas such as oxygen and ozone.

As shown in FIGS. 2A and 2B, the apparatus for cleaning the carrier film according to the present embodiment includes a holder (stage 105) that holds the carrier film 101 used in the multilayer ceramic capacitor manufacturing step and having the remaining dielectric ceramic layer 102 on the front surface 101*a*, and the nozzle 36 that sprays the water 201 containing the microbubbles onto the front surface 101*a* of the held carrier film 101 to peel the remaining dielectric ceramic layer 102 from the front surface 101*a*.

With the above-described configuration, the apparatus for cleaning the carrier film according to the present embodiment can peel the remaining dielectric ceramic layer 102 by spraying of the water 201 containing the microbubbles, and therefore, is low in cost and environmental load.

When the remaining dielectric ceramic layer 102 is peeled from the front surface 101*a*, the front surface 101*a* of the carrier film 101 having the remaining dielectric ceramic layer 102 is preferably sprayed only with the water containing the microbubbles.

With this configuration, the cost and the environmental load can be further reduced.

Next, the cleaning apparatus in a case of continuously cleaning the carrier film for recycle will be described.

Figure 4:
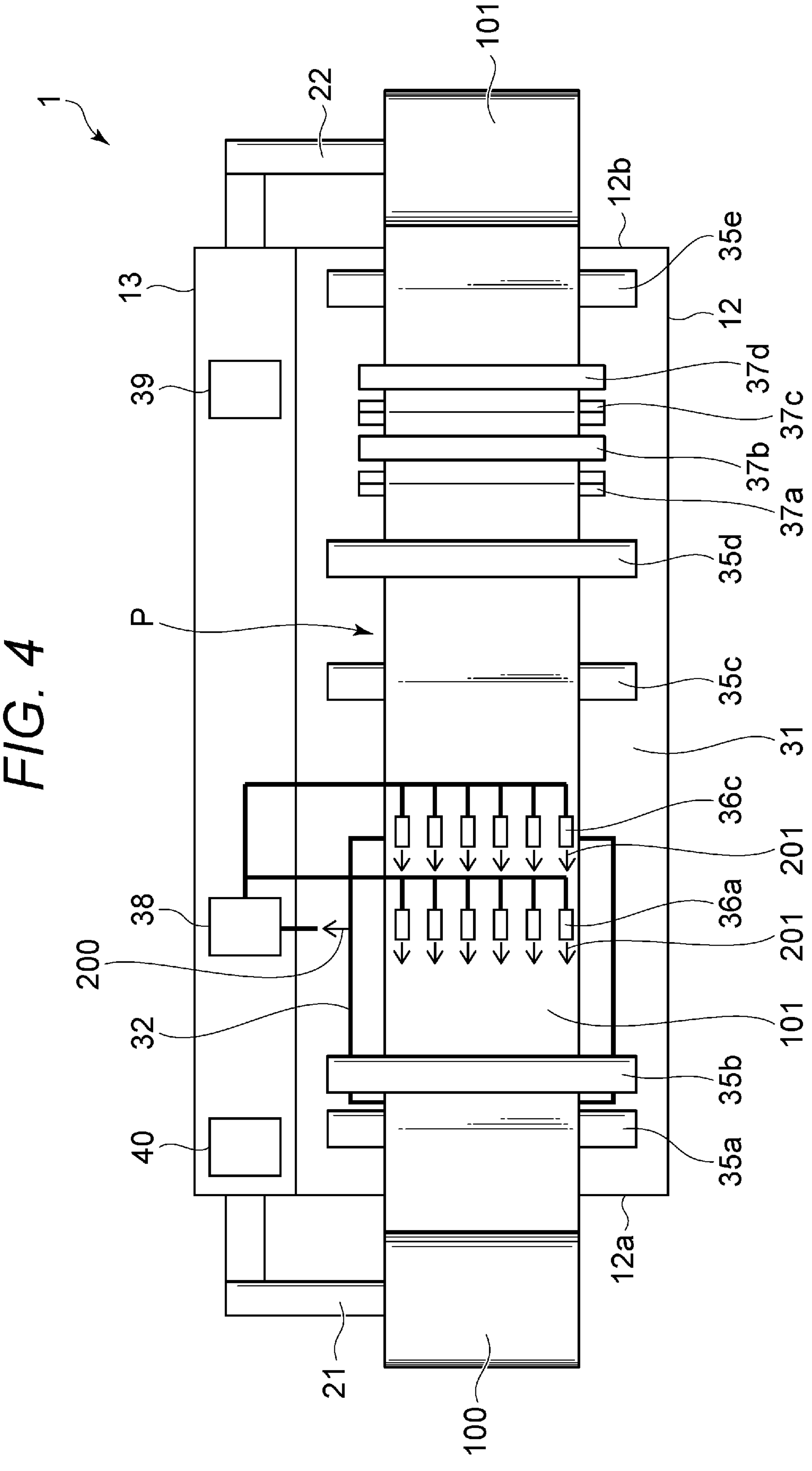
FIG. 4 is a top view showing the apparatus for cleaning the carrier film according to the embodiment in a case of continuously cleaning the carrier film.

FIG. 4 is a top view showing the apparatus for cleaning the carrier film according to the embodiment in a case of continuously cleaning the carrier film 101.

Figure 5:
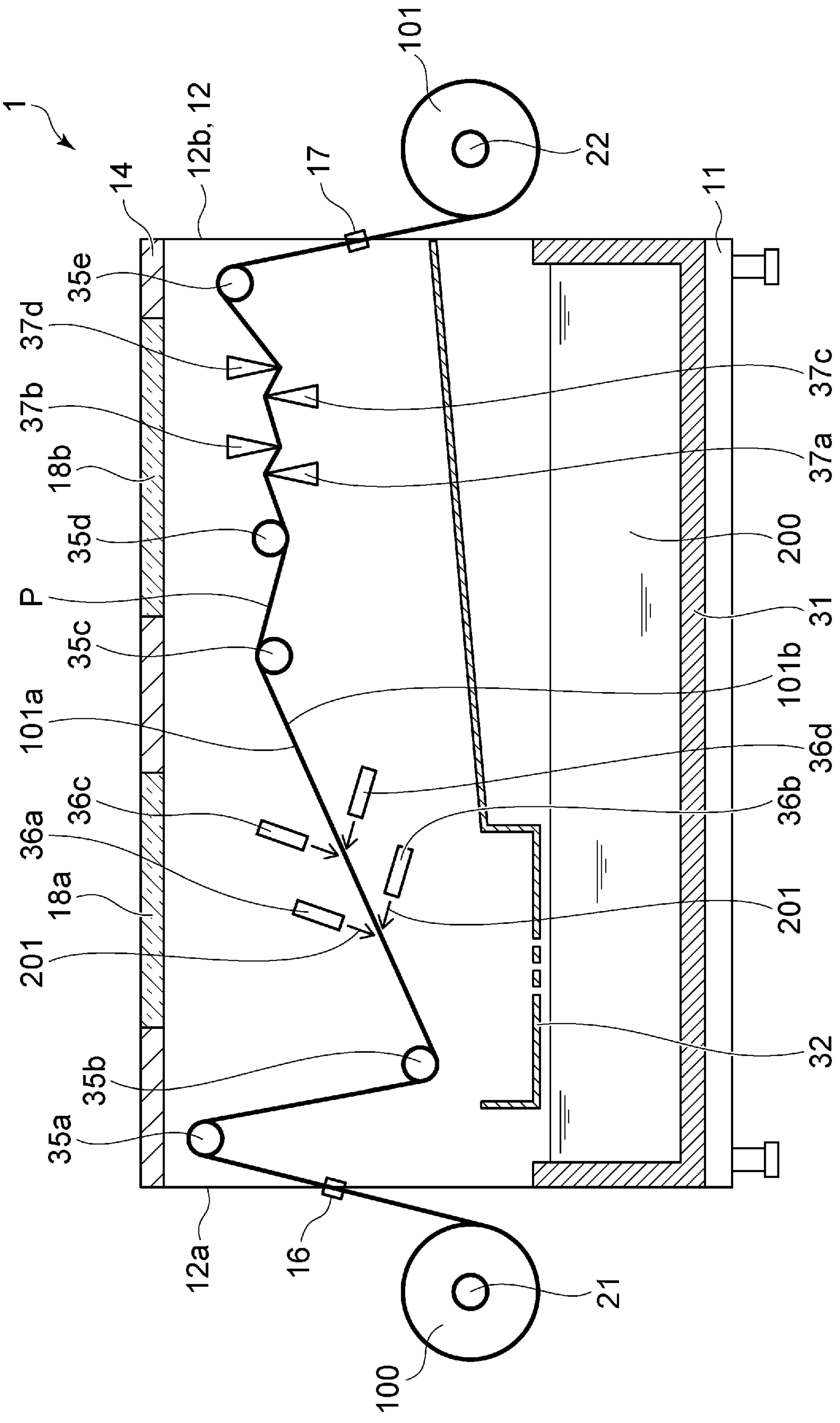
FIG. 5 is a sectional view showing the apparatus for cleaning the carrier film according to the embodiment in a case of continuously cleaning the carrier film.

FIG. 5 is a sectional view showing the apparatus for cleaning the carrier film according to the embodiment in a case of continuously cleaning the carrier film 101.

Note that FIGS. 4 and 5 are schematically shown and components are simplified or omitted as necessary. For example, in FIG. 4, a later-described upper lid 14 is omitted.

As shown in FIGS. 4 and 5, an apparatus 1 (hereinafter also merely referred to as an "apparatus 1") for cleaning the carrier film according to the present embodiment includes a base 11, a body 12, and a side box 13. A large portion of the base 11, the body 12, and the side box 13 is made, for example, of stainless steel. The base 11 is a mount contacting a floor surface of an installation space for the apparatus 1. The body 12 and the side box 13 are arranged on the base 11.

The shape of the body 12 is a substantially rectangular parallelepiped box shape, and is provided with the upper lid 14. The upper lid 14 is openable. In a case where the upper lid 14 is closed, the inside of the body 12 is a substantially watertight space. The front surface 12*a* of the body 12 is provided with an inlet slit 16. The rear surface 12*b* of the body 12 is provided with an outlet slit 17. Glass windows 18*a*, 18*b* are fitted in the upper lid 14. The side box 13 is arranged at the side of the body 12.

An inlet coil holder 21 is attached to below the inlet slit 16 of the front surface 12*a* of the body 12. An outlet coil holder 22 is attached to below the outlet slit 17 of the rear surface 12*b* of the body 12. A used carrier film 100 (above-described carrier film 101 having the remaining dielectric ceramic layer 102 and wound in the coil shape) wound in a coil shape is attached to the inlet coil holder 21. The dielectric ceramic layer 102 is peeled and removed while the used carrier film 100 is passing through the apparatus 1, and only the carrier film 101 is wound in a coil shape around the outlet coil holder 22. Hereinafter, in description of the inside of the body 12, the "carrier film 101" may include not only the carrier film 101 having no dielectric ceramic layer 102, but also the used carrier film 100 having the remaining dielectric ceramic layer 102.

A water tank 31 is provided in a lower portion in the body 12. The upper surface of the water tank 31 is opened. A filter 32 is arranged on the upper surface of the water tank 31. The water tank 31 recovers and holds the water after the water containing the microbubbles has been sprayed onto the carrier film 101 to peel the dielectric ceramic layer 102 and the peeled dielectric ceramic layer 102 has been removed from the water by the filter 32. The filter 32 separates the dielectric ceramic layer 102 from the water containing the peeled dielectric ceramic layer 102 after the water containing the microbubbles has been sprayed onto the carrier film 101. The filter 32 is, for example, a box-shaped structure made of stainless steel and opened at the upper surface, and part of the bottom of the filter 32 is made of punching metal. In an upper portion in the body 12, a plurality of rollers 35*a* to 35*e*, a plurality of nozzles 36*a* to 36*d*, and a plurality of scrapers 37*a* to 37*d* are arranged.

The plurality of rollers 35*a* to 35*e* (hereinafter also collectively referred to as a "roller(s) 35") forms, together with the inlet coil holder 21 and the outlet coil holder 22, a movement unit (mover) that moves the carrier film 101 from the inlet coil holder 21 to the outlet coil holder 22. The rollers 35 define a movement path P of the carrier film 101 in the body 12. The rotation axis of each roller 35 extends in the right-left direction (direction of the plane of paper) of the body 12.

The number and arrangement of the rollers 35 are arbitrary, but an example shown in FIGS. 4 and 5 will be described below.

The roller 35*a* is arranged on the upper side in rear of the inlet slit 16. The roller 35*b* is arranged on the lower side in rear of the roller 35*a*. The roller 35*c* is arranged on the upper side in rear of the roller 35*b*. The roller 35*d* is arranged in rear of the roller 35*c*. The roller 35*e* is arranged on the upper side in rear of the roller 35*d* and on the upper side in front of the outlet slit 17.

The movement path P of the carrier film 101 will be described. The carrier film 101 is unwound from the inlet coil holder 21, passes through the inlet slit 16, passes by the upper side of the roller 35*a*, the lower side of the roller 35*b*, the upper side of the roller 35*c*, the lower side of the roller 35*d*, and the upper side of the roller 35*e*, passes through the outlet slit 17, and is wound around the outlet coil holder 22. Note that FIGS. 4 and 5 show the example where the carrier film 101 is moved from an inlet coil to an outlet coil in an upward-unwinding downward-winding manner, but the present invention is not limited thereto and the carrier film 101 may be moved in an upward-unwinding upward-winding manner, a downward-unwinding downward-winding manner, or a downward-unwinding upward-winding manner.

The nozzles 36*a* to 36*d* are supplied with the water, and mix air with the water to generate the water 201 containing the microbubbles. The nozzles 36*a* to 36*d* spray the water 201 containing the microbubbles onto the first surface 101*a* and second surface 101*b* of the carrier film 101.

The nozzles 36*a* to 36*d* (hereinafter also collectively referred to as a "nozzle(s) 36) are arranged on the upper and lower sides with respect to the movement path P of the carrier film 101 between the roller 35*b* and the roller 35*c*. More specifically, the nozzle 36*a* is arranged on the upper side with respect to the movement path P. The nozzle 36*b* is arranged on the lower side with respect to the movement path P. The nozzle 36*c* is arranged on the upper side with respect to the movement path P in rear of the nozzle 36*a*. The nozzle 36*d* is arranged on the lower side with respect to the movement path P in rear of the nozzle 36*b*.

Each of the nozzles 36*a*, 36*b*, 36*c*, 36*d* includes a plurality of nozzles such as six nozzles, and these nozzles are arrayed, for example, at equal intervals along the width direction of the carrier film 101, i.e., the right-left direction of the body 12. Thus, 24 nozzles 36 are provided in total. A direction of each nozzle 36 discharging the water 201 is inclined forward with respect to the vertical direction. With this configuration, each nozzle 36 sprays the water 201 containing the microbubbles from the downstream side to the upstream side in the movement direction of the used carrier film 100.

As a result, an embodiment of the carrier film cleaning apparatus for continuously cleaning the used carrier film 100 can be implemented, in which the water containing the microbubbles is sprayed onto the front surface 101*a* at the angle in the planar direction from the direction perpendicular to the front surface 101*a*.

The scrapers 37*a* to 37*d* (hereinafter also collectively referred to as a "scraper(s) 37") are arranged on the upper and lower sides with respect to the movement path P of the carrier film 101 between the roller 35*d* and the roller 35*e*. More specifically, the scrapers 37*a*, 37*b*, 37*c*, 37*d* are arrayed in this order from the front surface 12*a* to the rear surface 12*b* of the body 12. Edges of the scrapers 37*a*, 37*c* face upward, and edges of the scrapers 37*b*, 37*d* face downward.

With this configuration, the carrier film 101 passes by the upper side of the scrapers 37*a*, 37*c* and the lower side of the scrapers 37*b*, 37*d* while contacting the scrapers 37. In other words, while the edges of the scrapers 37*a*, 37*c* are contacting the second surface 101*b* of the carrier film 101, the scrapers 37*a*, 37*c* move relative to the carrier film 101. While the edges of the scrapers 37*b*, 37*d* are contacting the first surface 101*a* of the carrier film 101, the scrapers 37*b*, 37*d* move relative to the carrier film 101. The scrapers 37 form a water removal unit that removes the water containing the microbubbles and remaining on the first surface 101*a* and second surface 101*b* (both surfaces) of the carrier film 101.

The glass windows 18*a*, 18*b* of the upper lid 14 are arranged immediately above the movement path P. With this configuration, the worker can visually check the cleaning treatment for the carrier film 101 through the glass windows 18*a*, 18*b*, and can check whether or not the dielectric ceramic layer 102 is removed from the carrier film 101 and whether or not the water containing the microbubbles is removed from the carrier film 101.

A pump 38, a motor 39, and a control apparatus 40 are provided in the side box 13. The inlet of the pump 38 is connected to the water tank 31. The outlet of the pump 38 is connected to each nozzle 36. The pump 38 is supplied with water 200 from the water tank 31, and pressurizes the water 200 and supplies the pressurized water 200 to the nozzles 36. The water tank 31, the pump 38, and the filter 32 form a circulation unit that supplies the water 200 to the nozzles 36 again after recovery of the water 201 containing the microbubbles and sprayed onto the carrier film 101.

The motor 39 is coupled to the outlet coil holder 22, the inlet coil holder 21, and at least one roller 35 through a mechanical unit such as a gear, and rotates these components. The roller 35 not coupled to the motor 39 is a driven roller. The motor 39 and the outlet coil holder 22, the inlet coil holder 21, and the roller 35 coupled to and rotated by the motor 39 form the mover for the carrier film 101.

The control apparatus 40 controls drive of the pump 38 and the motor 39. The control apparatus 40 may be provided with a control panel which can be operated by the worker.

The apparatus 1 is provided with a water supply pipe (not shown) supplied with the water 200 from the outside. The water supply pipe is connected to the inlet of the pump 38 or the water tank 31. With this configuration, the apparatus 1 can be supplied with the water 200.

Next, operation of the above-described apparatus 1, i.e., the method for cleaning the carrier film according to the embodiment in a case of continuously cleaning the carrier film, will be described.

Figure 6:
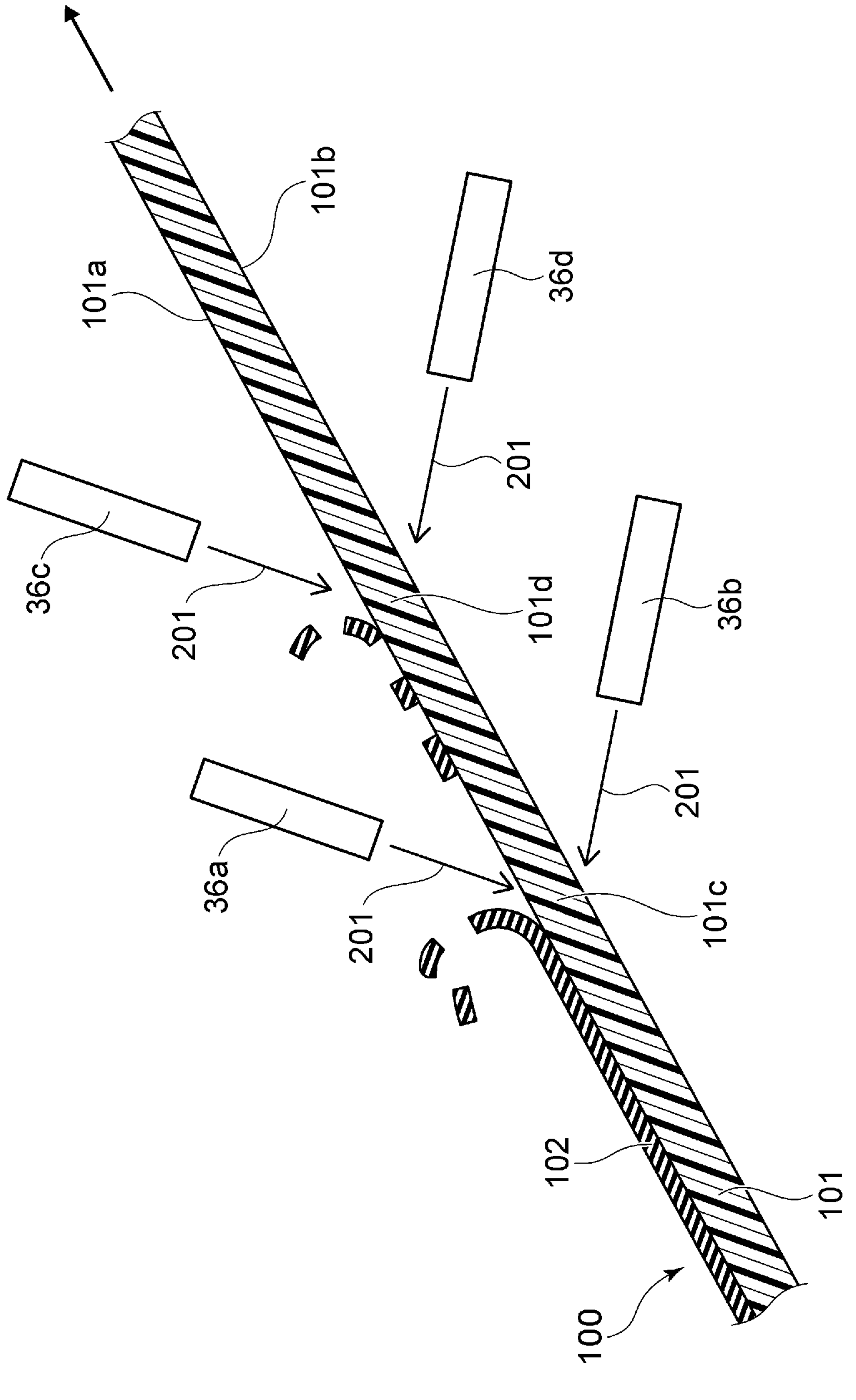
FIG. 6 is a conceptual sectional view showing the method for cleaning the carrier film according to the embodiment in a case of continuously cleaning the carrier film.

FIG. 6 is a conceptual sectional view showing the method for cleaning the carrier film according to the embodiment in a case of continuously cleaning the carrier film.

As shown in FIGS. 4 and 5, the used carrier film 100 wound in the coil shape is attached to the inlet coil holder 21 of the apparatus 1. Then, the upper lid 14 of the body 12 is opened, the used carrier film 100 is unwound from the coil along the movement path P, and the tip end of the used carrier film 100 is fixed to the outlet coil holder 22. Thereafter, the upper lid 14 is closed. Moreover, the water 200 is stored in the water tank 31 through the water supply pipe. Alternatively, the water supply pipe may be connected to the pump 38. The water 200 is, for example, the industrial water.

Next, the pump 38 is operated. Accordingly, the water 200 supplied from the water tank 31 or from the outside is pressurized and supplied to the nozzles 36, and is mixed with air in the nozzles 36. In this manner, the water 201 containing the microbubbles is generated, and is sprayed onto the used carrier film 100. Moreover, the motor 39 is operated. Accordingly, the outlet coil holder 22 and the like are rotated, and the used carrier film 100 moves along the movement path P from the inlet coil to the outlet coil.

As shown in FIG. 6, the water 201 containing the microbubbles and sprayed from the nozzles 36*a*, 36*c* reaches the first surface 101*a* of the carrier film 101, and the water 201 containing the microbubbles and sprayed from the nozzles 36*b*, 36*d* reaches the second surface 101*b* of the carrier film 101. The water 201 containing the microbubbles is sprayed from the downstream side to the upstream side in the movement direction of the carrier film 101.

For example, the water 201 containing the microbubbles and sprayed from the nozzle 36*a* and the water 201 containing the microbubbles and sprayed form the nozzle 36*b* reach the first surface 101*a* and second surface 101*b* of the carrier film 101 at a portion 101*c*, and press the portion 101*c* from both sides. Moreover, the water 201 containing the microbubbles and sprayed from the nozzle 36*c* and the water 201 containing the microbubbles and sprayed form the nozzle 36*d* reach the first surface 101*a* and second surface 101*b* of the carrier film 101 at a portion 101*d*, and press the portion 101*d* from both sides. The portion 101*d* is positioned on the downstream side, i.e., the side closer to the rear surface 12*b* of the body 12, with respect to the portion 101*c*.

When the water 201 containing the microbubbles enters an interface between the carrier film 101 and the dielectric ceramic layer 102, the dielectric ceramic layer 102 is peeled from the carrier film 101. In this manner, the dielectric ceramic layer 102 is removed from the used carrier film 100, and the carrier film 101 remains.

When the water 201 containing the microbubbles collides with the carrier film 101, most of the microbubbles disappear, and the water 201 turns into normal water. The water drops together with pieces of the dielectric ceramic layer 102 from the carrier film 101, and reaches the filter 32. The peeled dielectric ceramic layer 102 remains on the filter 32, and the water passes through holes of the punching metal of the filter 32 and drops into the water tank 31. In this manner, the water and the dielectric ceramic layer 102 are separated from each other. As described above, the water circulates in the order of (the water tank 31 (the water 200), the pump 38, the nozzles 36, the carrier film 101, the filter 32, and the water tank 31), and is re-used.

As shown in FIGS. 4 and 5, the carrier film 101 in a state of the water adhering to the carrier film 101 passes by the rollers 35*c*, 35*d*, and sequentially contacts the edges of the scrapers 37*a*, 37*b*, 37*c*, 37*d*. The scrapers 37*a*, 37*c* remove the water from the second surface 101*b* of the carrier film 101, and the scrapers 37*b*, 37*d* remove the water from the first surface 101*a* of the carrier film 101. In this manner, while contacting the first surface 101*a* and second surface 101*b* of the carrier film 101, the scrapers 37 move relative to the carrier film 101 to remove the water from the first surface 101*a* and second surface 101*b* of the carrier film 101.

The carrier film 101 from which the water has been removed is discharged from the body 12 through the outlet slit 17, and is wound in the coil shape around the outlet coil holder 22. In this manner, the carrier film 101 is cleaned.

Advantageous Effects

According to the present embodiment, the water 201 containing the microbubbles is sprayed onto the used carrier film 100 so that the dielectric ceramic layer 102 can be effectively removed from the used carrier film 100. As a result, the cost and the environmental load can be reduced in carrier film cleaning for recycle.

The nozzles 36 are arranged on both upper and lower sides with respect to the carrier film 101 so that the water 201 containing the microbubbles can collide with both the first surface 101*a* and second surface 101*b* of the carrier film 101. Thus, even if the dielectric ceramic layer 102 remains on either the first surface 101*a* or second surface 101*b* of the carrier film 101, the dielectric ceramic layer 102 can be removed. As a result, when the used carrier film 100 in the coil shape is attached to the inlet coil holder 21, it is not necessary to check whether the surface on which the dielectric ceramic layer 102 remains is the first surface 101*a* or the second surface 101*b*.

Further, the water 201 containing the microbubbles collides with the same portion of the carrier film 101 from both front and back sides. Thus, deformation of the carrier film 101 due to water pressure can be reduced while the dielectric ceramic layer 102 is efficiently removed.

In the present embodiment, while the carrier film 101 is moving along the movement path P, the nozzles 36 spray the water 201 containing the microbubbles from the downstream side to the upstream side in the movement direction of the carrier film 101. Thus, as compared to a case where the water 201 containing the microbubbles is sprayed from the upstream side to the downstream side in the movement direction of the carrier film 101, the water 201 containing the microbubbles can easily reach the interface between the carrier film 101 and the dielectric ceramic layer 102, and an effect of removing the dielectric ceramic layer 102 from the carrier film 101 can be enhanced.

Further, while the carrier film 101 is moving diagonally upward from the roller 35*b* to the roller 35*c*, the nozzles 36 spray the water 201 containing the microbubbles to the upstream side of the movement path P. Thus, the water from which the microbubbles have disappeared by collision with the carrier film 101 flows to the upstream side of the movement path P on the carrier film 101 due to the sprayed water pressure and the force of gravity, and drops from the carrier film 101 in the vicinity of the roller 35*b*. As a result, movement of the carrier film 101 to the scraper 37 in a state of the water adhering to the carrier film 101 can be reduced.

In the present embodiment, the water 201 containing the microbubbles is generated by the nozzle 36 by using the industrial water as the water. Moreover, the water 200 is re-used by the circulation unit including the water tank 31, the pump 38, and the filter 32. Thus, the cost necessary for cleaning the carrier film 101 can be further reduced, and the environmental load is also low. In some cases, the industrial water contains negative ions, and therefore, positive ions in the dielectric ceramic layer 102 can be electrically neutralized. In this case, an effect of removing the dielectric ceramic layer 102 from the carrier film 101 can also be enhanced.

Note that the cleaning treatment for the carrier film 101 may be performed in such a manner that water containing no microbubbles is sprayed onto the used carrier film 100. However, in this method, the dielectric ceramic layer 102 cannot be efficiently peeled from the carrier film 101. The water spraying pressure may be increased, but there is a probability that the apparatus becomes large, the cost increases, and the carrier film 101 is damaged by the water pressure.

The dielectric ceramic layer 102 may be removed from the carrier film 101 in such a manner that the used carrier film 100 is scraped with a knife edge. However, in this case, the dielectric ceramic layer 102 needs to be dipped in alcohol diluted water. For this reason, the treatment cost increases, the used alcohol diluted water needs to be discarded, and the environmental load increases.

On the other hand, according to the present embodiment, the method and apparatus for cleaning the carrier film, which are low in the cost and the environmental load, can be implemented.

The above-described embodiment is an embodied example of the present invention, and the present invention is not limited to this embodiment. For example, the present invention also includes those obtained in such a manner that addition, omission, or change is made to some components or steps of the above-described embodiment.

The present invention includes the following aspects.

(First Aspect)

A method for cleaning a carrier film, which includes spraying water containing microbubbles onto a surface of the carrier film having a remaining dielectric ceramic layer, thereby peeling the remaining dielectric ceramic layer from the surface.

(Second Aspect)

The method for cleaning the carrier film according to the first aspect, in which the water containing the microbubbles is sprayed onto the surface at an angle in a planar direction from a direction perpendicular to the surface.

(Third Aspect)

An apparatus for cleaning a carrier film, which includes a holder that holds the carrier film having a remaining dielectric ceramic layer, and a nozzle that sprays water containing microbubbles onto a surface of the held carrier film to peel the remaining dielectric ceramic layer from the surface.

(Fourth Aspect)

The apparatus for cleaning the carrier film according to the third aspect, which further includes a mover that moves the carrier film, in which the nozzle sprays the water containing the microbubbles from the downstream side to the upstream side in the movement direction of the carrier film.

(Fifth Aspect)

The apparatus for cleaning the carrier film according to the fourth aspect, which further includes a scraper arranged on the downstream side of the nozzle in the movement direction of the carrier film, contacting the surface of the carrier film, and moving relative to the carrier film.

REFERENCE SIGNS LIST

1: Cleaning Apparatus
11: Base
12: Body
12*a*: Front Surface
12*b*: Rear Surface
13: Side Box
14: Upper Lid
16: Inlet Slit
17: Outlet Slit
18*a*, 18*b*: Glass Window
21: Inlet Coil Holder
22: Outlet Coil Holder
31: Water Tank
32: Filter
35, 35*a* to 35*e*: Roller
36, 36*a* to 36*d*: Nozzle
37, 37*a* to 37*d*: Scraper
38: Pump
39: Motor
40: Control Apparatus
100: Used Carrier Film
101: Carrier Film
101*a*: First Surface
101*b*: Second Surface
101*c*, 101*d*: Portion
102: Dielectric Ceramic Layer
200: Water
201: Water Containing Microbubbles
P: Movement Path

What is claimed is:

1. A method for cleaning a carrier film, comprising:

oscillation spraying water containing a microbubble onto a surface of the carrier film having a remaining dielectric ceramic layer, thereby peeling the remaining dielectric ceramic layer from the surface.

2. The method for cleaning the carrier film according to claim 1, wherein the water containing the microbubble is sprayed onto the surface at an angle in a planar direction from a direction perpendicular to the surface.

3. An apparatus for cleaning a carrier film, comprising:

an inlet coil holder that holds the carrier film having a remaining dielectric ceramic layer and wound in a coil shape;

a nozzle that sprays water containing a microbubble onto a surface of the carrier film, which is unwound from the inlet coil holder, to peel the remaining dielectric ceramic layer from the surface;

an outlet coil holder that holds the carrier film from which the dielectric ceramic layer is peeled and removed, wherein the carrier film is wound in a coil shape around the outlet coil holder; and a mover that moves the carrier film from the inlet coil holder to the outlet coil holder.

4. The apparatus for cleaning the carrier film according to claim 3, wherein the nozzle sprays the water containing the microbubble from a downstream side to an upstream side in a movement direction of the carrier film.

5. The apparatus for cleaning the carrier film according to claim 4, further comprising:

a scraper arranged on the downstream side of the nozzle in the movement direction of the carrier film, contacting the surface of the carrier film, and moving relative to the carrier film.

* * * * *